United States Patent [19]

O'Ham

[11] Patent Number: 5,127,343
[45] Date of Patent: Jul. 7, 1992

[54] HYDROCARBON EXTRACTOR

[75] Inventor: Jeffrey K. O'Ham, Charlotte, N.C.

[73] Assignee: TerraChem Environmental Services, Inc., Pineville, N.C.

[21] Appl. No.: 778,346

[22] Filed: Oct. 16, 1991

[51] Int. Cl.⁵ .............................................. F23B 7/00
[52] U.S. Cl. .................................. 110/233; 47/1.42; 110/236; 110/250; 110/346; 134/21; 432/261
[58] Field of Search .............. 110/341, 346, 236, 349, 110/229, 233, 250; 34/15, 92, 237; 134/21, 105, 107; 432/14, 261; 47/1.42; 241/DIG. 10

[56] References Cited

U.S. PATENT DOCUMENTS

| | | | |
|---|---|---|---|
| 4,667,609 | 5/1987 | Hardison et al. | 110/236 |
| 4,821,654 | 4/1989 | Becker et al. | 110/236 |
| 4,895,085 | 1/1990 | Chips | 110/346 |
| 5,072,674 | 12/1991 | Noland et al. | 110/346 |
| 5,078,868 | 1/1992 | Robertson | 110/236 X |

Primary Examiner—Edward G. Favors
Attorney, Agent, or Firm—Ralph H. Dougherty

[57] ABSTRACT

An improved method and apparatus for removal of petroleum hydrocarbons from contaminated soil. The apparatus of the invention includes a shallow container, preferably with vertical sides, which has in its bottom wall a multiplicity of elongated recessed chambers with an open mesh entry area at the upper side, and a gas discharge orifice at one end of each chamber. A rack containing burners is adapted for positioning over the material to be treated within the container. The invented method includes charging materials to be treated into a container, heating the material while creating a partial pressure within the chamber, establishing a vacuum to pull the gasses downwardly through the soil and atmospheric air downwardly with the gasses, then either collecting or discharging the removed gasses, after which the soil is removed from the treatment chamber.

21 Claims, 3 Drawing Sheets

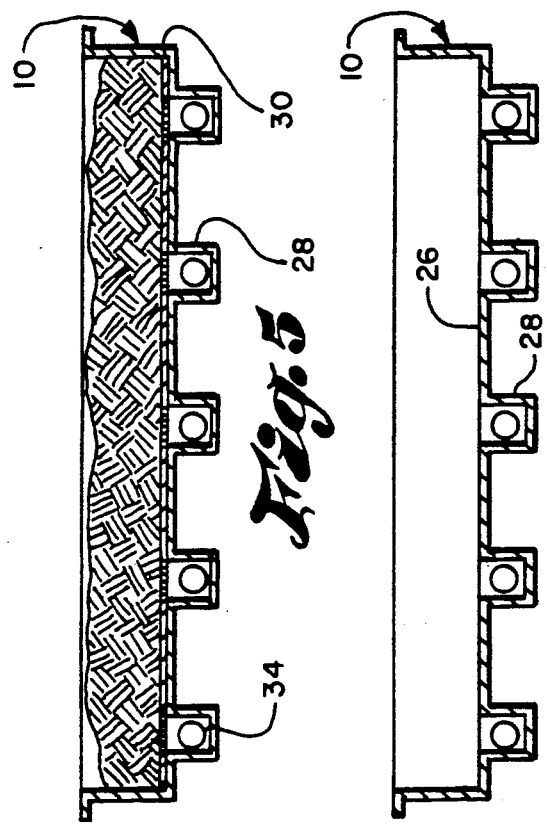
Fig. 5
Fig. 6
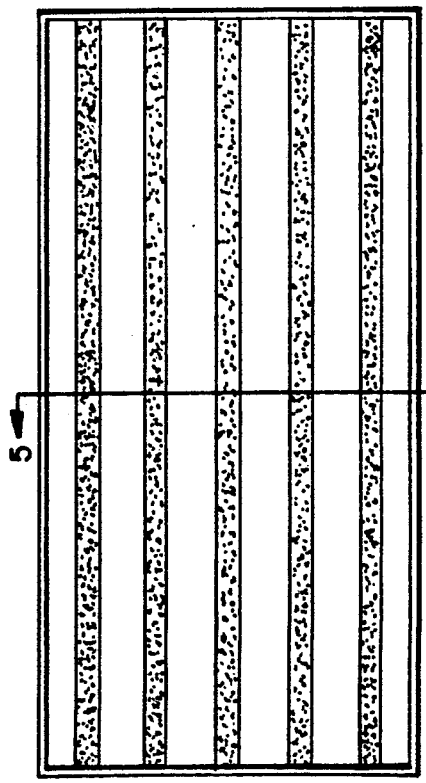
Fig. 3
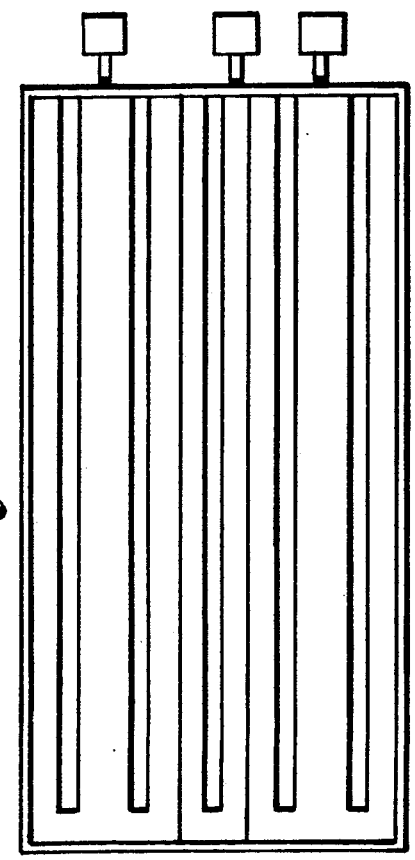
Fig. 4

HYDROCARBON EXTRACTOR

FIELD OF THE INVENTION

The present invention relates to a method and apparatus for decontaminating soil, and more particularly to a method and apparatus for the decontamination of soil by stripping of hydrocarbons therefrom, particularly petroleum hydrocarbons.

BACKGROUND OF THE INVENTION

The present invention is more particularly related to removal of petroleum hydrocarbons from contaminated soil or dirt which is found at or adjacent to gasoline storage tanks, gasoline pumps, and other areas where petroleum products have impregnated the ground. The invention is also useful for removal of hazardous and non-hazardous solvents, and volatile and semi-volatile organic compounds from soil, including, without limitation, toluene, ethanol, phenols, and chlorinated solvents.

It has been estimated that there are more than 120,000 gasoline service stations in the United States, each of which may have gasoline or other petroleum products spilled or discharged or leaked into the soil around such service stations. In addition, there are many thousands of other automotive repair shops and users of petroleum products which are equally subject to having had petroleum contaminants spilled or leaking into the soil during the many years which there was no attention to protection of the environment. In a recent Wall Street Journal article, it was reported that a high percentage of gasoline storage tanks are currently leaking, and these spills must be dealt with in the future. Whenever an area that has been contaminated by petroleum products is sold, or a new use of that area is begun, the Environmental Protective Agency, or its state equivalent, requires that all contaminated soil be removed and/or sanitized. This is currently a difficult and costly procedure.

DESCRIPTION OF THE PRIOR ART

Applicant is aware of the following U.S. Patents concerning cleaning of contaminated soil.

Hobbs U.S. Pat. No. 4,202,282, entitled "Method of Incineration", teaches a method for thermally processing materials in a chamber on a conveyer belt utilizing infrared heating to drive off gasses from the material being processed, and mixing the released gasses with air flowing over, above, and parallel to the materials in the opposite direction of the material movement to provide a portion of heat for drying the materials. Apparently the materials are wet at the time they are introduced to the incinerating chamber.

Bridges et al U.S. Pat. No. 4,670,634 teaches in situ decontamination utilizing radio frequency energy, collecting the removed hydrocarbons in fluid form.

Keating II, et al, in U.S. Pat. No. 4,815,398, teach an apparatus for drying contaminated material to below the cracking temperature of the volatile organics which contaminate the material, followed by heating in a kiln to a temperature high enough to break down the volatile organics to non-toxic products, and recovering the gaseous products.

DeLeur U.S. Pat. No. 4,881,475 teaches a method for cleaning contaminated soil by indirect heating of soil in a sealed rotating furnace, then combusting the released contaminants in a second furnace. In this case the heat is provided to the furnace wall, rather than directly impacting the soil.

Barcell U.S. Pat. No. 4,974,528 teaches another rotary dryer in which soil is exposed to a gaseous flame to volatilize the contaminants, air is mixed with the released volatiles to form an exhaust gas which is filtered, heated, and incinerated at less than 1700° F.

None of the processes mentioned in any of the patents listed above operate as a batch process with the soil stationary during treatment.

SUMMARY OF THE INVENTION

The present invention is an apparatus and method for decontaminating and sanitizing soil, particularly soil containing petroleum hydrocarbons, such as gasolines, oils, and the like. The apparatus comprises a generally flat, shallow container, preferably with vertical sides, the container having a multiplicity of elongated recessed chambers in its bottom wall, with an open mesh entry area at the upper side of the chambers, and a gas discharge orifice at one end of each such chamber. Vacuum pumps communicate with the interior of the container through the gas discharge orifice. A rack containing a multiplicity of burners or heaters, preferably infrared heaters, is adapted for positioning over the soil to be treated within the container, with the heaters directed downwardly against the upper surface of the soil. The rack of heaters may be adapted for sliding or rolling movement into and out of the operative position above the container. A vacuum pump provides the impetus for downward movement of the hydrocarbon vapors through the soil, which exits through the vacuum pump, and can be collected if desired. The unit is preferably portable, as the cost for transporting the unit to the site to be treated is much less than the cost of moving the earth to the treatment location and back to the place where is to be used as fill.

The method consists of charging materials such as contaminated dirt and soil into a treating chamber having sides and a bottom, and open to the atmosphere at the top, establishing a vacuum, or at least a partial vacuum, through the bottom of the container to establish a down draft through the generally loosely packed soil, heating the soil from the top, and pulling the hot gases downwardly through the soil, and atmospheric air downwardly behind or commingled with the gasses, releasing the hydrocarbon vapors, and collecting the hydrocarbon vapors in the recessed vacuum chambers as they exit the bottom of the soil layer, then either collecting or discharging the removed gasses. Finally, the decontaminated soil is removed from the treatment chamber.

OBJECTS OF THE INVENTION

The principal object of the present invention is to provide apparatus for extracting hydrocarbons from soil.

It is also an object of this invention to provide apparatus which can be vehicle mounted for transport.

If is another object of the present invention to provide apparatus for decontamination of soil which does not require a sealed chamber for treating of the soil.

It is also an object of the invention to provide a method for decontaminating soil which results in removing and discharging of gasses which are environmentally acceptable.

It is another object of this invention to provide apparatus for extracting hydrocarbons from soil which is capable of being transported to and operable at the site of the contaminated soil.

It is another object of this invention to provide apparatus for extracting hydrocarbons from soil which results in the treated soil meeting current environmental standards.

It is also an object of this invention to provide a method for removing entrained hydrocarbons particularly petroleum hydrocarbons from soil.

It is a further object of this invention to provide a method for removing entrained hydrocarbons from loose soil where the soil is stationary during treatment.

It is also an object of this invention to provide an economical and effective method for removing entrained hydrocarbons from loosened soil.

BRIEF DESCRIPTION OF THE DRAWINGS

The foregoing and other objects will become more readily apparent by referring to the following detailed description and the appended drawings, in which:

FIG. 3 is a top or plan view of the decontamination chamber.

FIG. 4 is a bottom view of the decontamination chamber of FIG. 3.

FIG. 5 is a cross-sectional view of the decontamination chamber after charging or loading, taken along line 5—5 of FIG. 3.

FIG. 6 is a cross-sectional view of the chamber of FIG. 3, taken along the line 5—5 of FIG. 3, with the soil support and soil removed therefrom.

DETAILED DESCRIPTION

Figure 1:
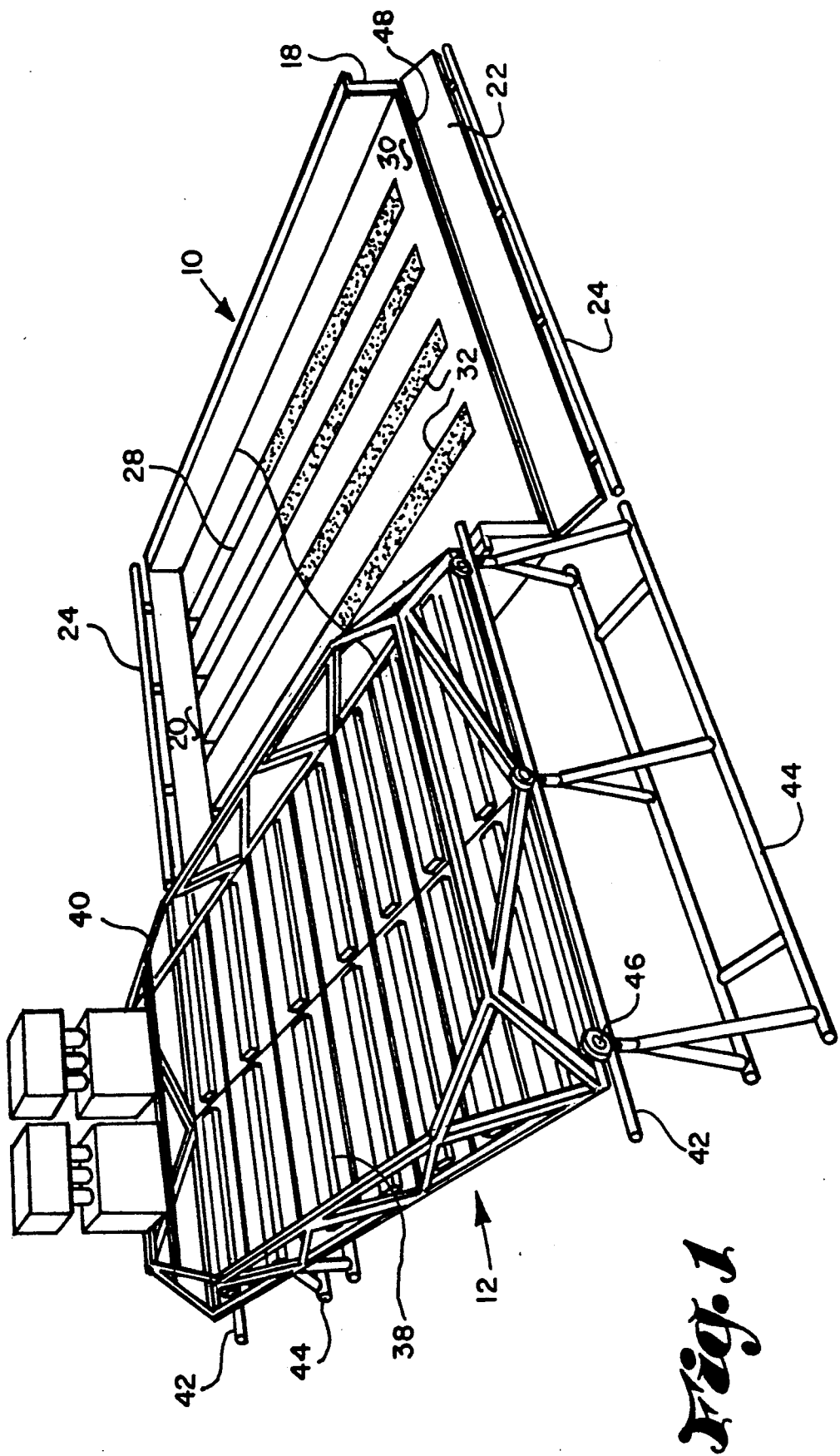
FIG. 1 is an isometric view of the invented soil treatment apparatus, with the soil treating chamber partially cut away, the apparatus being in the ready or charging orientation.
Figure 2:
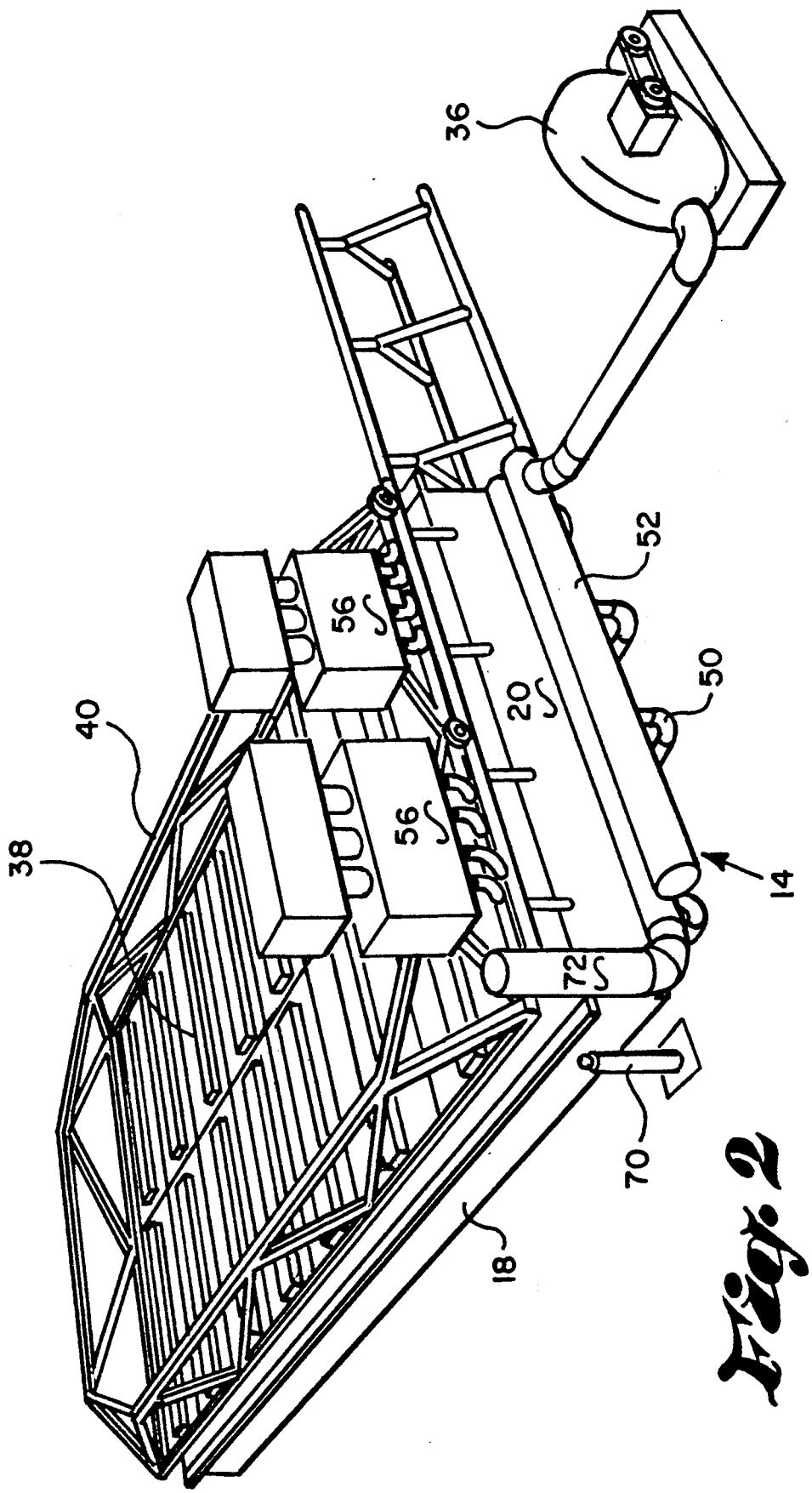
FIG. 2 is an isometric view of the apparatus of FIG. 1 in the decontamination mode, the view being taken from the opposite direction from the view of FIG. 1.

Referring now to the drawings, and particularly to FIGS. 1, and 2, the invented apparatus consists of three main parts, a soil treating vessel, chamber, or box 10, a bank of heaters 12, and vacuum and gas discharge system 14.

The soil treating vessel 10 is a box or receptacle of desired shape, a preferable rectangular shape is shown, having upstanding side walls 18, a fixed end wall 20, a hinged end wall 22, and bottom wall 26. The two end walls 20 and 22, each carry a rail 24 at the upper edge.

The bottom wall 26 of the soil treating box 10 has a multiplicity of vacuum chambers or wells 28. The end of each well adjacent the fixed end wall 20 is connected to vacuum system 14. A perforated floor plate 30 with perforations 32 above and aligned with the vacuum chambers is situated in the bottom of the soil receptacle 10. The vacuum wells can be either longitudinally or transversely oriented, but are preferably longitudinal. While it is possible to utilize the vacuum wells merely with a vacuum being pulled from one end, preferably each vacuum well has an elongated vacuum tube 34 situated within it, with the vacuum tube surrounded by pea gravel, which traps dirt particles and prevents them from entering the vacuum pump 36.

The heater apparatus 12 has a multiplicity of downwardly directed infrared heaters 38 which are sufficiently closely spaced to thoroughly heat the entire surface of soil when the heaters are in the operative position. The heaters are mounted in a frame or rack 40, which is itself mounted on rails 42, the rails 42 being mounted atop a rail support frame 44 which is aligned with the rails 24 atop the end walls 20, 22 of the soil treating chamber 10. The frame or rack 40 is adapted for sliding movement or rolling movement by wheels 46 into and out of the operative position above the chamber 10.

The hinged end wall 22, which is connected to bottom wall 26 by elongated hinge 48, is laid flat for accessibility by pay loaders or other convenient charging mechanisms for charging dirt or soil into the treating chamber.

The invented hydrocarbon extractor removes hydrocarbons, particularly petroleum hydrocarbons such as gasoline, diesel fuel, fuel oil, etc., from any friable, loosely packed contaminated material, but preferably from dirt or soil.

EXAMPLE

A preferred container is a steel box eight feet in width, sixteen feet in length and two feet deep. The box has two-inch slotted well screens in the bottom that are connected to a union 50 outside the box. Five spaced elongated wells 28 each contain a vacuum tube 34 surrounded with pea gravel. A manifold 52, to which all the vacuum tubes are attached, has a vacuum pulled through it. The vacuum has been measured from 2 to 10 inches of Hg (mercury) depending on the soil type being treated. The top of the box 10 has a rail system, with a horizontal rail on each end wall. Infrared heaters 38 are situated in a frame 40, with the heaters so spaced to provide heat coverage of the entire surface of the soil 66 to be treated in the box. The frame has mating rollers for engaging the rails, so the frame is readily movable from the stand-by position (FIG. 1) into the operative position (FIG. 2) over the box of untreated soil, and back again.

Contaminated soil 66 is loaded into the box 10 to a depth of about one foot (about 30 cm) as shown in FIG. 5. Vacuum pumping is initiated, then the heater assembly 12 is rolled into the operative position atop the box 10 and heaters 38 are ignited by activating heater controls 56. The soil 66 is heated on the surface to a depth of several inches below the surface. This is accomplished partly by radiant heat from the heaters and partly by convection caused by the vacuum system pulling the heat downwardly through the soil, which heats the material to sufficiently high temperatures that the contained hydrocarbons are vaporized, extracted from their former locations, removed through application of the vacuum and forced out of the soil by the heated atmospheric air following the vapors. After the material is treated, the decontaminated soil is unloaded from the chamber, advantageously with a front end loader and stockpiled until cool.

The removed gasses are exhausted to the atmosphere through exhaust stack 72, which may include emission controls therein, such as a carbon bed, an afterburner, a condenser, a catalytic converter, a scrubber, a precipitator, a cyclone, or the like. Alternatively, stack 72 may be connected to one or more emission controls, such as any of the foregoing, or a baghouse.

The infrared heated, vacuum hydrocarbon extractor works on two principles. First, infrared light heats the soil and the hydrocarbons both radiantly and by convection. The infrared light excites the molecules it strikes, causing them to vibrate rapidly. This produces heat, which is transferred through convection. A vacuum is pulled through tubes at a point furthest away from the infrared heat source. This vacuum performs two functions: (1) draw the convection heat through the source to heat the soil not exposed to the infrared light, and (2) reduce the vapor pressure within the treatment chamber. Second, lowering of the pressure decreases the boiling point of the hydrocarbons being liberated from the treated soil. The vapor pressure—boiling point relationship is expressed by the following well known empirical equation for specific substances for which a and b values are known, wherein p=pressure in mm Hg; T=temperature in degrees Kelvin; a and b are constants given (among other places) in the CRC Handbook of Chemistry and Physics, 69th ed. (1988), beginning page D-212.

$$\log 10p = \frac{.05223a}{T} + b$$

This allows the removal of contaminants with higher boiling points at lower temperature. The energy needed to heat the system is only about one-fourth as much as required by other thermal stripping systems. The vacuum also works in a physical way as well. By physically drawing and saturating the treated soil with air, the heated air will displace the other gasses present and sweep them out of the treating chamber, which adds to the effectiveness of the system.

In the prior art, the material being treated has been agitated or has been placed into a very thin, usually free-falling depth of material to allow full treatment. In the present invention loosely packed granular material is placed into the vessel; heaters are moved into position over the soil; a vacuum is initiated beneath the vessel, acting on the soil throughout the perforated floor; the heaters are ignited, heating the soil evenly and thoroughly to a substantial depth; ambient air entering the chamber at all locations above the soil is also heated and pulled downwardly through the loosely packed soil, carrying heat to the lower-most particles. The combination of heat and reduced pressure removes the volatiles from the soil and the vacuum draws the removed volatiles out from the treating chamber through the vacuum wells.

ALTERNATIVE EMBODIMENTS

The tops of the end walls 20,24 can be utilized as the rails for the burner assembly wheels 46. While the burner assembly is normally pushed into position by hand, it is possible to provide a low power drive motor to drive the burner assembly into and out of the operative position.

A pusher mechanism can be provided at one end to shove out the dirt from the treating chamber, and the opposed upstanding end can be hinged so that the treated soil can be shoved out very easily through the open end. The pusher mechanism can be situated within the chamber, or it can even be an exterior force, such as a truck-mounted pusher, i.e., a bulldozer-like blade mounted on a beam or yoke. Such pushing mechanisms work because the dirt is charged to a shallow depth, and it is friable.

The treating chamber can be provided with a lifting mechanism 70 at the closed end, such as a hydraulic or pneumatic cylinder, which will create a dump-truck style effect to empty the treating chamber after removal of the vaporized hydrocarbons from the treated soil.

SUMMARY OF THE ACHIEVEMENT OF THE OBJECTS OF THE INVENTION

From the foregoing, it is readily apparent that I have invented an improved, economical, and effective method for decontaminating soil by removing entrained hydrocarbons, particularly petroleum hydrocarbons, from loosened soil, where the soil is stationary during treatment, and which results in removing and discharging of gasses which are environmentally acceptable. The invented apparatus for decontamination of soil by extracting hydrocarbons therefrom does not require a sealed chamber for treating of the soil, the apparatus being transportable to and operable at the site of the contaminated soil, the output of which meets current environmental standards.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method for removing hydrocarbons from soil, comprising placing the soil in an open container, heating the soil and the entrained hydrocarbons by directing heat against the soil;
   creating a sub-atmospheric pressure within the soil by establishing a vacuum beneath the soil;
   vaporizing the hydrocarbons within the soil;
   removing the vaporized hydrocarbon downwardly from the soil;
   withdrawing the vaporized hydrocarbon from beneath the soil; and
   discharging the vaporized hydrocarbons.

2. A method according to claim 1, further comprising collecting the discharged vaporized hydrocarbons.

3. A method according to claim wherein the heating is accomplished by radiant heating.

4. A method according to claim wherein the heating is accomplished by infrared heating.

5. A method according to claim 1, wherein the soil is placed in the container in generally loose form.

6. A method according to claim 1, wherein the soil is placed in the container to a generally even depth.

7. A method according to claim 1, further comprising collecting the discharged gasses.

8. A method according to claim 1, further comprising heating ambient air above the soil, and drawing the heated ambient air downwardly with the vaporized gasses.

9. A method according to claim 1, wherein the vacuum created beneath the soil is from 2 to 10 inches of mercury.

10. Apparatus for treating soil, comprising:
    a shallow container, having vertical sides and a bottom wall;
    a multiplicity of recessed chambers beneath said bottom wall, and fixed thereto;
    said bottom wall being provided with orifices for gas communication between said container and said chambers;
    means communicating with said chambers for removing gases from said chambers and said container; and
    means for heating the interior of said container.

11. Apparatus according to claim 10, wherein said means for removing gases is a vacuum pump.

12. Apparatus according to claim 11, wherein said means for removing gases includes each vacuum chamber having a vacuum tube situated therein, communicating with said vacuum pump.

13. Apparatus according to claim 12, wherein each vacuum tube is surrounded by pea gravel.

14. Apparatus according to claim 10, wherein one of said vertical sides is hinged to said bottom wall.

15. Apparatus according to claim 10, wherein said means for heating the interior of said container is a heater mounted above and spaced from the bottom wall of said container, and adapted to heat the upper surface of material in said container generally evenly.

16. Apparatus according to claim 15, further comprising means for moving said heater from a stand-by position adjacent said container to an operating position over said container.

17. Apparatus according to claim 15, comprising a rack having at least one heater mounted therein, track means associated with said container, and track engaging means associated with said rack.

18. Apparatus according to claim 17, wherein said track engaging means are wheels journalled on said rack.

19. Apparatus according to claim 15, wherein said heater is a radiant heater.

20. Apparatus according to claim 15, wherein said heater is an infrared heater.

21. Apparatus according to claim 10, further comprising means attached to one end of said container for lifting such end and substantially emptying said container.

* * * * *